United States Patent [19]

Veith et al.

[11] 4,322,657

[45] Mar. 30, 1982

[54] GAS-DISCHARGE DISPLAY DEVICE

[75] Inventors: Werner Veith, Heidelberg; Karl-Heinz Walter, Grafing, both of Fed. Rep. of Germany

[73] Assignee: Siemens Aktiengesellschaft, Berlin & Munich, Fed. Rep. of Germany

[21] Appl. No.: 98,125

[22] Filed: Nov. 28, 1979

[30] Foreign Application Priority Data

Dec. 20, 1978 [DE] Fed. Rep. of Germany ....... 2855056

[51] Int. Cl.³ ............................................. H04N 3/16

[52] U.S. Cl. ....................................... 313/485; 315/59

[58] Field of Search ....................... 313/484, 485, 495; 315/59

[56] References Cited

U.S. PATENT DOCUMENTS

| | | | |
|---|---|---|---|
| 2,595,617 | 5/1952 | Toulon | 313/182 X |
| 3,956,667 | 5/1976 | Veith | 313/217 X |

*Primary Examiner*—Palmer C. Demeo
*Assistant Examiner*—Darwin R. Hostetter
*Attorney, Agent, or Firm*—Hill, Van Santen, Steadman, Chiara & Simpson

[57] ABSTRACT

A gas-discharge display device for a flat and fluorescent screen is provided with at least one grid electrode between the matrix-driven control disc and the anode of the fluorescent screen for the specific field distribution in the acceleration space, the grid electrode or electrodes being connected to a respective fixed potential.

13 Claims, 1 Drawing Figure

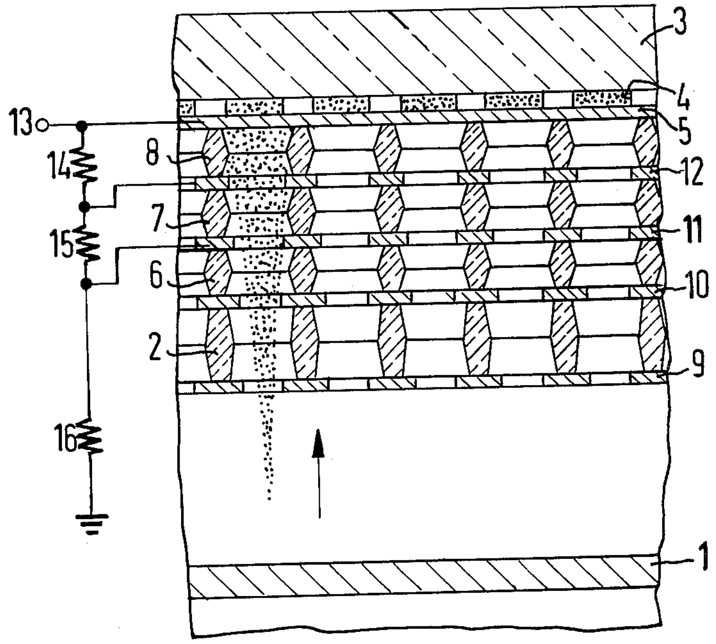
3
4
5
13
8
14
12
7
11
15
6
10
2
9
16
1

GAS-DISCHARGE DISPLAY DEVICE

BACKGROUND OF THE INVENTION

1. Field of the Invention

The present invention relates to a gas discharge display device for a flat screen, and is more particularly concerned with such a structure in which a gas discharge space is limited by one or more cathodes and by the row conductor side of a control disc having a matrix-driven hole grid, and in which an acceleration space is located between the other, column conductor side, of the control disc and a luminescent screen with an anode layer.

2. Description of the Prior Art

A gas-discharge display device of the type generally set forth above is known and described, for example, in the German published application No. 24 12 869. The control disc with its hole structure coinciding with the luminescent dot grid of the fluorescent screen separates the gas discharge space from the acceleration space. The matrix drive of the control holes is carried out by means of row conductors on the back side of the control disc facing the acceleration space and by means of column conductors on the front side of the disc. The holes in the control disc are located at the intersections of the row conductors and column conductors.

By driving a row conductor and a column conductor, electrons are drawn from the plasma generated in the gas-discharge space through the control hole disc at the row/column intersection and are accelerated by the high voltage anode layer in the direction of the matrix of luminous dots, in particular toward the luminous dot at the selected location on a fluorescent screen. In order to achieve a sufficient excitation of the luminous substance, the acceleration must be as high as possible, on the one hand, and, on the other hand, the acceleration portion is very short (approximately 0.5–2 mm), so that, according to the Paschen Law, a further gas discharge in this acceleration space is avoided; because of the limited insulation, the field strength also cannot be established as high as is desired.

If, on occasion, however, a gas discharge should occur in the acceleration space, then the current must flow off by way of the very fine column conductors and the control elements, usually semiconductors, connected thereto. These currents and overvoltages which thereby occur are dangerous to the control/switching elements.

SUMMARY OF THE INVENTION

The object of the present invention is to counter the aforementioned danger, for example to provide measures which render undesired gas discharges in the acceleration space harmless and, as far as possible, to prevent such gas discharges.

In order to achieve the above object, a gas-discharge display device constructed in accordance with the present invention has the same features of that initially mentioned, and, in addition, is provided with at least one grid electrode with the same hole grid as that of the control disc and located in the acceleration space parallel to the control disc. By means of external electrical connection, the grid electrode receives a potential which determines the electric field between the column conductor and the anode layer.

The effect of a grid electrode with a fixed potential is comparable to that of the screen grid in a classic tetrode tube. The influence of the anode voltage on the electron stream is significantly reduced. By so doing, the probability of undesired gas discharges is lower, even given high anode voltages.

The insertion of such a control electrode raises structural problems in view of the small space available, i.e. the depth, and the high requirements concerning parallelism over the entire picture screen surface. Therefore, a particular feature of the invention is highly advantageous in which the grid electrode is formed by means of a metal layer on a perforate glass plate which serves as a spacer between the control disc and the fluorescent screen.

Such a spacer per se has already been proposed in the German application No. P 28 02 976.7. In that development, one proceeds from an advantageous method of manufacture for perforate glass plates and stacks a plurality of thin, perforate glass plates with aligned holes on top of one another. This stack then fills out the entire acceleration space and sees to the accurate observance of the internal control disc/fluorescent screen over the entire picture surface. Metal layers which can later remain in the stack serve as etching masks for the individual perforate glass plates. Such a metal layer can advantageously be employed as the grid electrode of the present invention.

According to a further development of the invention, not only one grid electrode, but two or more are employed. To this end, it is then provided that a plurality of perforate glass plates are placed on top of one another as a spacer filling out the acceleration space and that the metal layers then interpose between the perforate glass plates serve as the grid electrodes for determining the electric field course.

By employing such structure, the course of the electric acceleration field can be precisely and constantly determined. First of all, there is the possibility of permitting the field to proceed linearly. Even with a single grid electrode, a uniform distribution is possible. However, it is more advantageous when the electric field in the acceleration space is distributed non-linearly, whereby the maximum field strength occurs between the anode and the neighboring grid electrode.

Given the latter, non-linear field distribution, a primary gas discharge in the proximity of a column conductors is very improbable. This non-linear field distribution with the relatively low field strength at the column conductors provides a further advantage in that the penetration factor of the acceleration field into the control space becomes significantly smaller. The negative total control voltage at the column conductors required for holding all electrons back can then be lower. Further, it is advantageous for the quality of the gas-discharge display device that, because of the low penetration factor of the acceleration field, few ions are drawn from the gas-discharge space into the control holes. Such ions then draw electrons thereto and cause a dark current, which cannot be avoided per se but which is to be held as small as possible, and, therefore, undesired background luminescence.

The adjustment of the grid electrode potential can additionally be made independent of the electro-optical lens effect of the grid apertures on the diverging electron beams. The width of the luminescent dots on the fluorescent screen can be set to an optimum in this manner. An effect which supports this effect can be achieved by means of specific aperture sizes in the grid electrode or, respectively, in the plurality of grid electrodes.

According to a further development of the invention, it is provided that the potential of the grid electrode or, respectively, the potentials of the grid electrodes, be derived from the anode voltage via an ohmic voltage divider. Thereby, it is favorable that the grid electrode which lies nearest the control disc lie at least at approximately the same potential as the control disc. When, in addition, the grid electrode lying next to the control disc is also grounded, or is at least connected to a low-resistance ground, the probability that gas discharges, which undesirably still occur in the acceleration space, flow in currents via column conductors and the control/switching elements connected thereto are as small as desired. Such currents are then certainly diverted via this particular grid electrode.

BRIEF DESCRIPTION OF THE DRAWINGS

Other objects, features and advantages of the invention, its organization, construction and operation will be best understood from the following detailed description, taken in conjunction with the accompanying drawing, on which there is a single FIGURE which is a sectional view taken through a portion of a gas-discharge display device constructed in accordance with the present invention.

DESCRIPTION OF THE PREFERRED EMBODIMENTS

Turning to the drawing, a cathode 1 is provided to emit electrons into an area adjacent a control disc 2, this being the gas discharge space of the gas-discharge display device. A protective glass plate 3 forms a part of the fluorescent screen. The glass plate 3 carries a matrix of luminescent dots 4 on its inner surface and an anode layer 5 on the luminescent dots 4. The acceleration space lies between the control disc 2 and the anode layer 5. The acceleration spaces filled with three perforate glass plates 6, 7 and 8 which are stacked on one another as spacers between the control disc 2 and the anode layer 5 or, respectively, the fluorescent screen with the protective glass plate 3, the luminescent dots 4 and the anode layer 5. A plurality of row conductors 9 are carried on one surface of the control disc 2 which faces the gas-discharge space and a plurality of column conductors 10 are carried on the opposite surface facing the anode 5. The row and column conductors extend in different directions so that the intersections thereof lie at the holes in the perforate glass plates 6, 7 and 8, which holes are aligned in the direction toward the luminescent dots 4. The row and column conductors are also perforate to display the same matrix pattern as the holes of the perforate plates 2, 6 and 7 and 8 and of the luminescent dots 4. A grid electrode 11 with the same matrix pattern of holes lies between the perforate glass plates 6 and 7, while a similar perforate grid electrode 12 lies between the perforate glass plates 7 and 8. The holes of the grid electrode 12 are larger than those of the grid electrode 11.

The anode layer 5 is connected to a connection terminal 13 for receiving a high anode voltage. A voltage divider comprising three ohmic resistors 14, 15 and 16 connected between the terminal 13 and ground. The voltage divider has taps which are connected to the respective grid electrodes 11 and 12. The remaining connections for the cathode 1, the row conductors 9 and the column conductors 10 have been omitted from the drawing.

An electron beam is schematically indicated as results by driving the corresponding row conductor 9 and column conductor 10 of the control disc 2. The electron beam is drawn from the gas-discharge space in the direction of the arrow and, expanding through the perforate glass plates 6, 7 and 8, and through the grid electrodes 11 and 12, travels toward the anode layer 5 and toward the luminescent dot 4 lying in front of the anode layer 5. One obtains an optimum guidance of the electron beam with respect to its acceleration distribution and its form by means of the size of the individual apertures in the grid electrodes 11 and 12 and by means of the selection of the potentials applied to the taps of the voltage divider 14, 15 and 16. The expansion is precisely adapted to the size of a luminescent dot 4. The distribution of the acceleration field between the column conductors 10 and the anode layer 5 proceeds non-linearly. The electric field between the grid electrode 12 and the anode layer 5 is greater than that between the grid electrodes 11 and 12. The electric field between the column conductors 10 and the grid electrode 11 is significantly smaller than that between the grid electrodes 11 and 12.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a gas-discharge display device of the type having an electron emitter, a matrix control hole grid disc with intersecting row and column conductors on opposite sides of a control hole plate, a fluorescent screen with an anode adjacent thereto, and an acceleration space between the matrix control hole grid disc and the anode, the improvement therein comprising:
- at least one grid electrode in the acceleration space parallel to the matrix control hole grid disc for receiving a grid potential to determine the electron course between the disc and the anode, said grid electrode having a hole grid aligned with the hole grid of the disc.

2. The improved device of claim 1, wherein said grid electrode comprises:
- a perforate glass plate; and
- a perforate metal layer on said glass plate.

3. The improved device of claim 1, comprising a plurality of said grid electrodes comprising:
- a plurality of perforate glass plates stacked one upon another; and
- a plurality of perforate metal layers disposed between said glass plates.

4. The improved device of claim 3, and further comprising:
- means, including said grid electrodes, for linearly distributing the electric field in the acceleration space.

5. The improved device of claim 3, and further comprising:
- means including said grid electrodes for non-linearly distributing the electric field in the acceleration space with the maximum field strength located between the anode and the nearest metal layer of said grid electrodes.

6. The improved device of claim 1, and further comprising:

a voltage divider including a respective tap connected to each said grid electrode.

7. The improved device of claim 1, and further comprising:

a plurality of said grid electrodes; and means for applying approximately the same voltage to the disc and the nearest grid electrode.

8. The improved device of claim 1, and further comprising:

a plurality of said grid electrodes; and means applying selected potentials to said grid electrodes.

9. The improved device of claim 8, wherein said means includes:

means applying ground potential to the grid electrode nearest the disc.

10. The improved device of claim 8, wherein said means includes:

means applying low-resistance ground potential to the grid electrode nearest the disc.

11. A gas-discharge display device comprising:

a gas-tight housing including a viewing screen and a matrix of luminous dots on the inner surface of said screen;

an anode adjacent said matrix of luminous dots;

an emitter in said housing spaced from said anode;

a control disc comprising a first glass plate with a matrix of holes therethrough, row conductors on the emitter side of said first glass plate and column conductors on the anode side of said first glass plate, said row and column conductors being perforate corresponding to the hole matrix;

a plurality of second glass plates stacked one upon another between said control disc and said anode, each of said second glass plates including a matrix of holes therethrough aligned with the matrices of holes and luminous dots; and a plurality of metal layers sandwiched between said second glass plates as grid elctrodes, said metal layers being perforate corresponding to the matrices and adapted to receive grid potentials to control the electric field between said control disc and said anode.

12. The display device of claim 11, comprising:

a voltage divider including a plurality of taps each connected to a respective grid electrode.

13. The display device of claim 12, wherein:

said voltage divider taps are connected with said grid electrodes such that the grid potentials decrease for electrodes more distant from said anode.

* * * * *